United States Patent
Cotton et al.

(10) Patent No.: US 9,005,685 B2
(45) Date of Patent: Apr. 14, 2015

(54) FRUIT PASTE-BASED FOOD PRODUCT INCORPORATING HIGH PROTEIN PARTICULATES

(71) Applicant: General Mills, Inc., Minneapolis, MN (US)

(72) Inventors: Whitni Cotton, Highland Heights, KY (US); Penny Hurlston, Broomfield, CO (US); Jesse Van Hallowell, Frederick, CO (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 13/705,687

(22) Filed: Dec. 5, 2012

(65) Prior Publication Data

US 2014/0154364 A1    Jun. 5, 2014

(51) Int. Cl.
*A23L 1/06* (2006.01)
*A23L 1/00* (2006.01)

(52) U.S. Cl.
CPC ................................... *A23L 1/0073* (2013.01)

(58) Field of Classification Search
USPC .............. 426/89, 94, 102, 104, 302, 660, 656
See application file for complete search history.

(56) References Cited

U.S. PATENT DOCUMENTS

| | | | |
|---|---|---|---|
| 2,868,647 A | 1/1959 | Vollink | |
| 5,645,878 A | 7/1997 | Breslin et al. | |
| 6,800,310 B2 | 10/2004 | Squire et al. | |
| 7,097,870 B2 | 8/2006 | Funk et al. | |
| 7,220,442 B2 | 5/2007 | Gautam et al. | |
| 7,431,955 B2 | 10/2008 | Froseth et al. | |
| 7,629,008 B2 | 12/2009 | Coleman et al. | |
| 7,790,210 B2 | 9/2010 | Funk | |
| 2004/0241287 A1 | 12/2004 | Bastiaans et al. | |
| 2005/0181019 A1 | 8/2005 | Palmer et al. | |
| 2007/0087084 A1 | 4/2007 | Coleman et al. | |
| 2007/0231450 A1 | 10/2007 | Coleman et al. | |
| 2008/0020098 A1 | 1/2008 | Gautam et al. | |
| 2008/0102168 A1 | 5/2008 | Borders et al. | |
| 2008/0305215 A1 | 12/2008 | Froseth et al. | |
| 2009/0162500 A1 | 6/2009 | Mui et al. | |
| 2011/0159158 A1 | 6/2011 | Penna et al. | |
| 2012/0082763 A1* | 4/2012 | Laukli et al. .................... 426/96 |

* cited by examiner

*Primary Examiner* — Lien T Tran
(74) *Attorney, Agent, or Firm* — Diederiks & Whitelaw, PLC; Gregory P. Kaihoi

(57) ABSTRACT

A food product is defined by a moist, fruit-paste matrix, having a water activity level in a range of 0.55 to 0.70, within which protein particulates are intermixed. The protein particulates include protein bits having a bulk density of about 0.4 g/cc and provided with a natural syrup coating. With the added protein bits, the protein level of the food product is at least 10 grams per serving or 10 grams/50-55 grams of the food product. The food product can be provided in the form of a snack product, such as a bite-sized snack product or a snack bar. The invention also sets forth a method of making the food product wherein provisions are taken to assure that the protein bits are properly coated, separated, sized and added to the fruit-paste matrix under time and other condition constraints to assure the integrity of the protein bits.

18 Claims, 1 Drawing Sheet

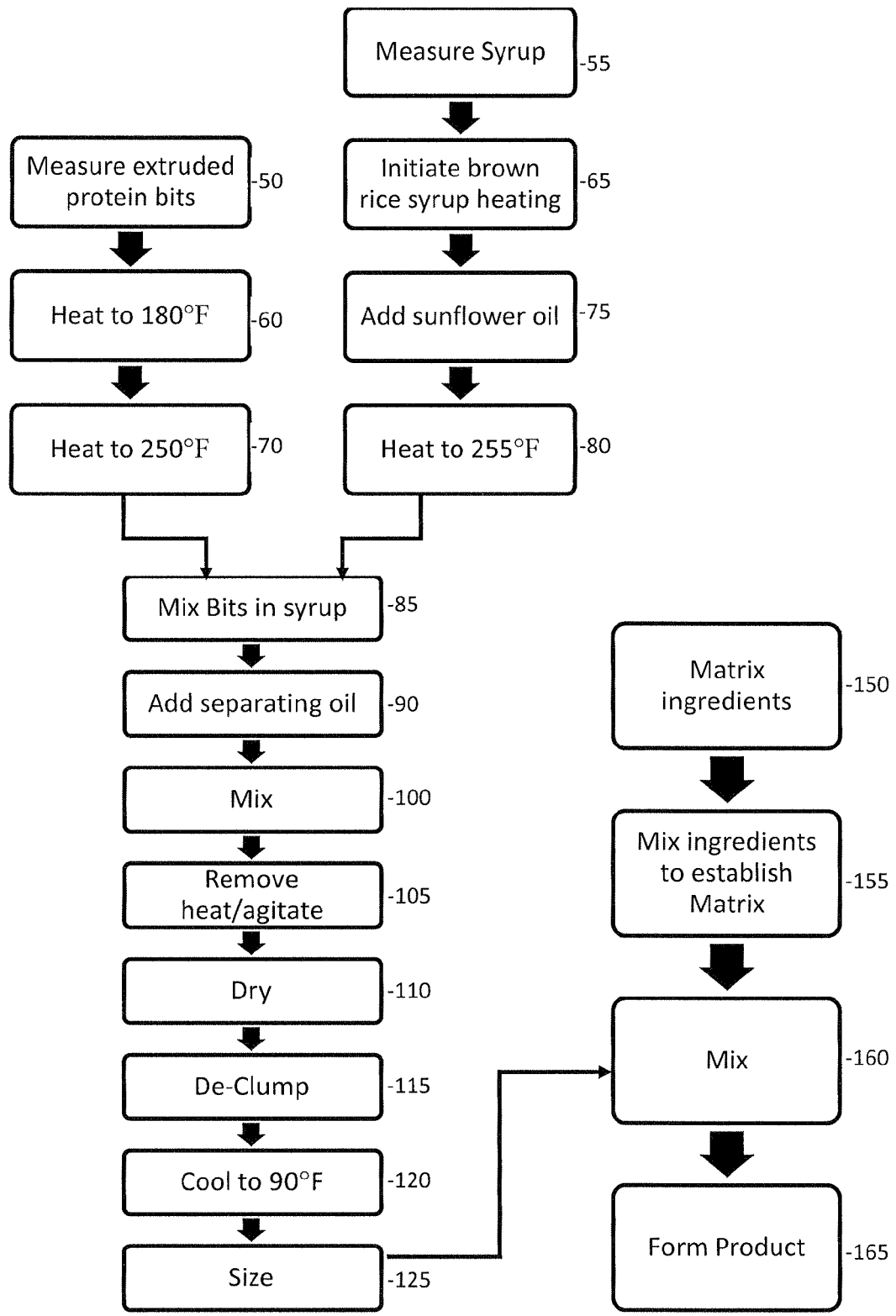

FRUIT PASTE-BASED FOOD PRODUCT INCORPORATING HIGH PROTEIN PARTICULATES

FIELD OF THE INVENTION

The invention pertains to establishing a food product having a main, fruit paste matrix within which are disbursed high protein particulates which remain crunchy over an extended period of time.

BACKGROUND OF THE INVENTION

Food products representing wholesome, often natural, snacks can be found in various forms, including snack bars. Depending on the composition of the bars, they can be classified in numerous ways, including as nutrition bars. It is known in the art to specifically enhance the protein level of certain food products, including nutrition bars. Certainly, there exist an abundance of potential protein sources, such as soybean, cottonseed, meat, poultry, fish and the like meals. Nuts are another potential source of protein proposed for addition into food products, including snack bars, to enhance the protein level of the overall food product.

Of course, protein sources in liquid and powder forms can be rather easily incorporated into an overall snack food composition. However, one particular concern of the present invention is the addition of protein particulates into a high moisture level food base. In this context, unless the resulting snack product is consumed in a relatively short period of time, excessive moisture from the food base will migrate into the protein particulates, thereby changing the entire consistency and texture of the food product. In some situations, this may be deemed perfectly acceptable. However, in accordance with the invention, it is actually desired to provide crunchy protein particulates and maintain the crunchy nature of the protein particulates for extended periods of time. Under these circumstances, provisions must be taken to maintain the desired attributes of the protein particulates. As the present invention is also concerned with the nature of the ingredients employed, as well as the type and percentage of protein utilized, still further potential problems need to be addressed to establish an acceptable result.

SUMMARY OF THE INVENTION

The present invention is directed to a food product made from a moist, fruit-paste matrix, having a water activity level in a range of 0.55 to 0.70, within which coated protein particulates are intermixed. The coated protein particulates themselves include protein bits, which are made from non-nut sources, specifically pea protein, provided with a natural syrup coating such that the coated protein particulates have a crunchy texture attribute and will remain crunchy in the fruit-paste matrix over an extended period of time versus protein pieces which do not include a corresponding syrup coating. The invention also pertains to a method of making the food product.

The resulting food product is all natural and gluten free. The food product is formulated without ingredients that have been genetically modified, and the added protein is from a non-diary, non-soy source. The matrix maintains a moist, fruit-paste consistency, while the protein particulates exhibit a crunchy texture throughout a long shelf life, such as in the order of 10 months. With the added protein bits, the protein level of the food product is in the order of at least 10 grams per serving or 10 grams/50-55 grams of the food product. The food product is provided in the form of a snack product, such as a bite-sized snack product or a snack bar. Method aspects of the invention particularly exhibit important temperature parameters and operational timing features found necessary to establish an acceptable food product. In any case, additional objects, features and advantages of the invention will become more readily apparent from the following detailed description of preferred embodiments thereof when taken in conjunction with the drawing.

BRIEF DESCRIPTION OF THE DRAWINGS

The accompanying figure sets forth a flow diagram for a method of making the food product in accordance with the invention.

DETAILED DESCRIPTION OF INVENTION

As indicated above, the invention is directed to providing a fruit-based food snack product having a high protein level and exhibiting a crunchy textural aspect for an extended period of time by using only limited and all-natural ingredients. The invention is particularly achieved by adding protein particulates, including protein bits which have been coated with syrup, into a moist, fruit-paste matrix to establish a snack food product having at least 10 grams of protein per serving. In accordance with method aspects of the invention, provisions are taken to assure that the protein bits are properly coated, separated, sized and added to the fruit-paste matrix under time and other condition constraints to assure the integrity of the protein particulates.

In connection with the overall invention, it is desired to have the resulting food product be all natural and gluten free. In addition, the food product is also specifically designed without ingredients that have been genetically modified, and the added protein is from a non-diary, non-soy source. To this end, the food product is formulated from a minimal number of ingredients, preferably less than 15 ingredients and, more preferably, 12 or less. Furthermore, the overall base matrix must maintain a moist, fruit-paste consistency, while the protein particulates exhibit a crunchy texture throughout a long shelf life, which is in the order of 10 months. By "moist", it is meant that the fruit-paste matrix has a water activity level of at least 0.55, particularly in a range of 0.55 to 0.70. The fruit of the matrix acts as the necessary binder for the protein particulates and the hardened syrup coating on the protein bits assures a crunchy texture despite some potential migration of moisture from the fruit-paste matrix into the bits, thereby enabling the overall coated protein particulates to maintain their crunchy texture.

By way of example, reference is initially made to Table 1 below which sets forth the ingredients and associated protein percentages in connection with the formation of a date-based snack bar including protein particulates. As shown, the fruit-paste matrix is based on dates and almond butter as the main ingredients. Almonds, fruits and/or further minor ingredients could also be added in small percentages. More importantly, protein particulates are added in the range of 25-35% of the overall product formulation.

TABLE 1

Almond-Date Based

| Description | % Formula | Approx. Protein Contribution (g/50 g serving) |
| --- | --- | --- |
| Almonds | 0-10% | 0-1 |
| Almond Butter | 7-30% | 1-3 |
| Dates | 30-50% | 0.4-0.6 |
| Coated Pea Protein bits | 25-35% | 6-8 |
| Other Fruits/Minor Ingredients | 0-5% | 0 |

As for the protein bits themselves, reference is made to Table 2 below which sets forth a preferred formulation. As shown, the protein bits mainly include crisp, extruded pea protein with a brown rice syrup coating. As will be detailed more fully below, sunflower oil and/or lecithin can also be employed.

TABLE 2

| Description | % Formula | Approx. Protein Contribution (g/100 g) |
| --- | --- | --- |
| Brown Rice Syrup | 20-30% | 0 |
| Sunflower Oil | 0-2% | 0 |
| Sunflower Lecithin | 0-0.5% | 0 |
| Pea Protein | 70-80% | 44-52 |

By way of another example, reference is made to Table 3 below which sets forth the ingredients and associated protein percentages in connection with the formation of a peanut and apple-based snack bar including protein particulates. As shown, a fruit-paste matrix is again based on dates as the main ingredient, along with unsalted peanut butter. Roasted, granulated peanuts, ground evaporated apples, ground cinnamon, pumpkin powder, a pumpkin spice seasoning and a dry apple flavoring can be added. Here, pea protein particulates in the range of 20-35% of the overall product are again added in accordance with Table 2.

TABLE 3

Peanut-Date Based

| Description | % Formula | Approx. Protein Contribution (g/55 g serving) |
| --- | --- | --- |
| Peanut Butter | 10-25% | 2-4 |
| Peanut | 0-10% | 0-1 |
| Dates | 30-50% | 0.4-0.7 |
| Coated Pea Protein bits | 20-35% | 5-9 |
| Other Fruits/Minor Ingredients | 0-15% | 0 |

At this point, it should be noted that these tables only set forth exemplary embodiments of the invention. In accordance with the overall invention, various fruit bases can be used to establish the moist matrix, including figs and raisins. By being limited to a fruit-paste matrix, the matrix itself need not include any syrup to act as a binder. Instead, the fruit performs this necessary function. However, certain formulations have been established employing a small amount of syrup, such as brown rice syrup added at a level up to 5%. In addition, it should be noted that no sucrose needs to be added for crystallization purposes. In all, these aspects can further promote the desire to minimize the number of ingredients and enhance the overall natural characteristics of the food product. Similarly, the syrup used to coat the pea protein bits is also limited to a natural list, including honey, maple, tapioca, agave, brown rice, date and sorghum syrups. In general, the syrup performs two main functions, i.e., the syrup hardens around the protein bit and retains its structure despite some moisture potentially migrating into the pea protein bit from the fruit-paste matrix thereby enabling the crunchy texture of the coated pea protein particulate to be maintained for an extended shelf life in the order of 10 months. The addition of the pea protein establishes a protein level in the order of at least 10 grams per serving or 10 grams/50-55 grams of the food product. The food product can take various forms, particularly bite-sized and bar-type snack products.

In connection with method aspects of the invention, reference is made to the accompanying figure which sets forth a flow chart setting forth different method steps and parameters in accordance with the invention. The flow chart includes parallel upper paths for the base matrix and the protein particulate, with these paths merging as the protein particulates are timely mixed into the matrix as will now be detailed. Initially, with respect to the particulates, the figure starts with the pea protein being already extruded and cut into bits which are measured at 50 while the selected syrup (here brown rice syrup) is measured at 55. Although not represented in this figure, the bits are preferably formed by cleaning and milling pea into pea flour which is then further processed, such as by separation, kneading, flocculation, setting, drying, sieving and, potentially, magnetic separation operations, to result in an pea protein extrudate which is cut into bits having a bulk density of 0.3-0.6 g/cc, and preferably about 0.4 g/cc. In any case, the measured bits are heated at step 60, such as to approximately 180° F. (about 82° C.). Reaching this temperature for the bits is used as a timing mark to initiate heating of the syrup at 65. The bits are further heated to 250° F. (121° C.) at 70. Although lower temperature ranges would be possible, the overall heating range for the bits is preferably established between 170° F. (77° C.) and 255° F. (124° C.), particularly to prevent agglomeration problems. As indicated at step 80, sunflower oil is added to the brown rice syrup at 75 and then heated to 255° F. (124° C.).

At this point, the bits are mixed with and coated by the syrup at step 85 to establish the protein particulates. A separating oil can be added at 90 and mixed with the coated bits at 100 for a predetermined amount of time, such as about 10 seconds. Thereafter, the heat is removed while the coated bits are agitated at step 105. At this time, the coated bits are dried at 110, such as through a convection operation, to establish a moisture content of less than 6%, preferably about 4%. Upon drying, the particulates are de-clumped at 115, either manually or through mechanical means. Once de-clumped, the particulates or coated bits are cooled to about 90° F. (about 32° C.) at step 120 and then sized, such as by passing the particulates through a ¼" (0.64 cm) sieve in step 125 to achieve particulates in the range of greater than 2 mm and up to 6 mm.

For the fruit-based matrix, the processing starts with the fruit paste and selected ingredients at step 150. At step 155, all of the ingredients are initially mixed, except the coated protein bits which are added at step 160. At step 165, the final product is formed into desired shaped and sized pieces, particularly to establish bite-sized or bar shaped food snacks at 165. In most preferred forms, the food snack has dimensions of 80-90 cm long, 30-40 cm wide and 15-20 cm thick. Overall, the established method assures that the protein bits are properly coated, separated, sized and added to the fruit-paste matrix under time and other condition constraints to assure the integrity of the coated protein bits.

Based on the above, it should be readily apparent that the present invention establishes a high protein level snack product which has a fruit base having a paste-like consistency with a plurality of crunchy protein particulates dispersed therein. Although described with respect to preferred embodiments of the invention, it should be understood that various changes and/or modifications can be made to the invention without departing from the spirit thereof. For instance, main embodiments of the invention employ a concentrated pea protein with 80% protein on an as is basis. However, other natural protein concentrates, such as rice protein, could be used to establish different levels of protein content. In addition, as indicated above, the snack product can be made from various different fruit base ingredients and a wide range of syrups for coating the bits, while still being all natural and gluten free. Furthermore, deviations in the timing or steps taken in connection with adding the particulates to the fruit-paste matrix can be taken. For instance, it has been found that the particulates can be pre-mixed with the nut butter and then added to the remaining matrix ingredients to improve distribution while still maintaining the integrity of the coated protein bits. In any case, the invention is only intended to be limited by the scope of the following claims.

The invention claimed is:

1. A food product, comprising:
   a moist, fruit-paste matrix having a water activity level in a range of 0.55 to 0.70; and,
   protein particulates intermixed with the fruit-paste matrix, said protein particulates including protein bits, established from a non-dairy and non-soy protein source, and a syrup coating selected from the group consisting of honey, maple, tapioca, agave, brown rice, date and sorghum syrups, provided directly on and hardened around the protein bits such that the protein particulates have a crunchy texture attribute and remain crunchy in the fruit-paste matrix over an extended period of time versus protein particulates which do not include a corresponding syrup coating.

2. The food product of claim 1 wherein the protein particulates are included in an amount of 20-35% of the food product.

3. The food product of claim 2 wherein the protein particulates includes 35-55 g protein/100 grams of the particulates.

4. The food product of claim 1 wherein the protein bits are approximately 80% pea protein.

5. The food product of claim 1 wherein the protein particulates have a size ranging from greater than 2 mm and up to 6 mm.

6. The food product of claim 1 wherein the syrup coating lacks any added sucrose.

7. The food product of claim 1 wherein the fruit-paste matrix is selected from the group consisting of a fig matrix, a raisin matrix, a date matrix and a combination thereof.

8. The food product of claim 1 wherein the protein bits have a bulk density of 0.3-0.6 g/cc.

9. The food product of claim 8 wherein the bulk density is about 0.4 g/cc.

10. The food product of claim 1 wherein the fruit-paste matrix employs fruit as a binder and lacks any syrup binder.

11. The food product of claim 1 defining a bar having at least 10 grams of protein per serving.

12. A method for preparing food products comprising the steps of:
   providing a fruit-paste matrix having a water activity in the range of 0.55-0.70;
   coating protein bits, constituting a non-dairy and non-soy protein source, with a syrup selected from the group consisting of honey, maple, tapioca, agave, brown rice, date and sorghum syrups, applied directly on and hardened around the protein bits to establish protein particulates having a crunchy texture attribute;
   intermixing the protein particulates into the fruit-paste matrix to form a composite food product in which the protein particulates remain crunchy over an extended period of time versus protein particulates which do not include a corresponding syrup coating; and
   forming individual food products from the composite food product.

13. The method of claim 12 wherein the protein particulates are included in an amount of 20-35% of the composite food product.

14. A method for preparing food products comprising the steps of:
   providing a fruit-paste matrix having a water activity in the range of 0.55-0.70;
   coating protein bits, constituting a non-dairy and non-soy protein source, with a syrup selected from the group consisting of honey, maple, tapioca, agave, brown rice, date and sorghum syrups to establish protein particulates having a crunchy texture attribute, wherein the coating of the protein bits includes heating extruded protein bits to 170° F-255° F. (77° C.-124° C.), separately heating the syrup to about 255° F. (124° C.), and combining the heated extruded protein bits and the heated syrup;
   intermixing the protein particulates into the fruit-paste matrix to form a composite food product in which the protein particulates are included in an amount of 20-35% of the composite food product and remain crunchy over an extended period of time versus protein particulates which do not include a corresponding syrup coating; and
   forming individual food products from the composite food product.

15. The method of claim 14 wherein the coating step further includes air drying the protein particulates to approximately 90° F. (32° C.).

16. The method of claim 12 further comprising: selecting the fruit-paste matrix from the group consisting of a fig matrix, a raisin matrix, a date matrix and a combination thereof.

17. The method of claim 12 further comprising: drying and de-clumping the protein particulates prior to intermixing the protein particulates into the fruit-paste matrix.

18. The method of claim 17 further comprising: cooling and sizing the protein particulates prior to intermixing the protein particulates into the fruit-paste matrix.

* * * * *